United States Patent [19]
Yoshinaga et al.

[11] Patent Number: 5,574,924
[45] Date of Patent: Nov. 12, 1996

[54] VECTOR PROCESSING DEVICE THAT UTILIZES POST MARKS TO ENSURE SERIALIZATION OF ACCESS REQUESTS OF VECTOR STORE INSTRUCTIONS

[75] Inventors: Toru Yoshinaga; Takashi Mochiyama, both of Kawasaki, Japan

[73] Assignee: Fujitsu Limited, Kawasaki, Japan

[21] Appl. No.: 121,552

[22] Filed: Sep. 16, 1993

[30] Foreign Application Priority Data

Nov. 30, 1992 [JP] Japan ................................. 4-320592

[51] Int. Cl.[6] ................................. G06F 15/347
[52] U.S. Cl. .................... 395/800; 395/427; 395/376; 364/DIG. 1; 364/232.21; 364/281.5
[58] Field of Search ..................... 395/800, 425, 395/375; 364/DIG. 1

[56]  References Cited

U.S. PATENT DOCUMENTS

| | | | |
|---|---|---|---|
| 4,780,811 | 10/1988 | Aoyama et al. | 364/DIG. 1 |
| 4,985,827 | 1/1991 | Hamanaka et al. | 364/DIG. 1 |
| 4,991,083 | 2/1991 | Aoyama et al. | 364/DIG. 1 |
| 5,060,148 | 10/1991 | Isobe et al. | 364/DIG. 1 |
| 5,075,846 | 12/1991 | Reininger et al. | 364/DIG. 1 |
| 5,247,691 | 9/1993 | Sakai | 395/800 |
| 5,297,267 | 3/1994 | Inoue | 395/425 |
| 5,381,536 | 1/1995 | Phelps et al. | 395/375 |

FOREIGN PATENT DOCUMENTS

| | | |
|---|---|---|
| 0042442 | 12/1981 | European Pat. Off. . |
| 0396892 | 11/1990 | European Pat. Off. . |
| 0398639 | 11/1990 | European Pat. Off. . |
| 0495165 | 7/1992 | European Pat. Off. . |
| 59-121441 | 7/1984 | Japan . |
| 60-118977 | 6/1985 | Japan . |
| 60-222969 | 11/1985 | Japan . |
| 61-100845 | 5/1986 | Japan . |
| 2-098776 | 4/1990 | Japan . |

*Primary Examiner*—Alyssa H. Bowler
*Assistant Examiner*—Walter D. Davis
*Attorney, Agent, or Firm*—Staas & Halsey

[57] ABSTRACT

A vector processing unit includes a vector unit having a plurality of operation pipelines and a vector register connected to the plurality of operation pipelines, a scalar unit having a buffer, and a memory unit. A memory unit controller, which is connected between the memory unit and the vector unit and between the memory unit and the scalar unit, performs an information transfer in accordance with a serializing process among access requests by using a post instruction and a wait instruction. The access requests sandwiched between the post instruction and the wait instruction are serially carried out whereby the memory unit is serially accessed. A first unit assigns a post mark to each of access requests of vector store instructions that are issued during a time when the post instruction is being executed, and stops instruction execution of the scalar unit when there is a vector store instruction proceeding to the post instruction. A second unit detects completion of execution of an access request which proceeds to the post instruction and which does not have the post mark, and causes the scalar unit to start to operate when the above completion is detected.

3 Claims, 11 Drawing Sheets

VECTOR PROCESSING DEVICE THAT UTILIZES POST MARKS TO ENSURE SERIALIZATION OF ACCESS REQUESTS OF VECTOR STORE INSTRUCTIONS

BACKGROUND OF THE INVENTION

1. Field of the Invention

The present invention relates to a vector processing device that processes a large quantity of vector data by one instruction, and more particularly to a serializing control of instruction execution using a post instruction and a wait instruction in a vector processing device in which a data buffer is provided between an instruction executing unit and a main memory unit.

A vector processing device has a plurality of operation pipelines, and performs a complex process by means of the pipelines in order to process a large quantity of data at a high speed. Generally, the vector processing device includes an instruction executing unit including a vector unit and a scalar unit, a main memory unit, and a memory control unit. The vector unit includes a vector register, and operation pipelines for an addition/logic operation, multiplication and division. Data to be operated (operation data) is read from the main memory unit and is stored in a data buffer provided in the memory control unit. Thereafter, the read operation data is loaded into the vector register in the vector unit. The operation data is operated by means of the operation pipelines in accordance with a vector instruction. The operation result thus obtained is transferred to and stored in the data buffer in the memory control unit, and is then stored in the main memory unit.

In some cases, a system as mentioned above employs a preceding control and parallel execution between a scalar instruction and a vector instruction and/or between vector instructions. In this case, the order of referring to the main memory unit may not be ensured. Hence, in order to ensure the order of referring to the main memory unit, it is necessary to serialize vector instructions.

The serializing of vector instructions is to terminate a main memory operand access generated during execution of a first instruction before a main memory operand access of a second instruction to be executed after the first instruction is generated. The serializing of vector instructions is important to main memory operand accesses between vector instructions or between a vector instruction and a scalar instruction, and is not need to be considered between scalar instructions because the order of referring to the main memory unit between scalar instructions is ensured. In order to satisfy the requirements of speeding up in recent computer systems for scientific technology, the present invention is intended to reduce overhead caused by the serialization of vector instructions.

2. Description of the Prior Art

Figure 1:
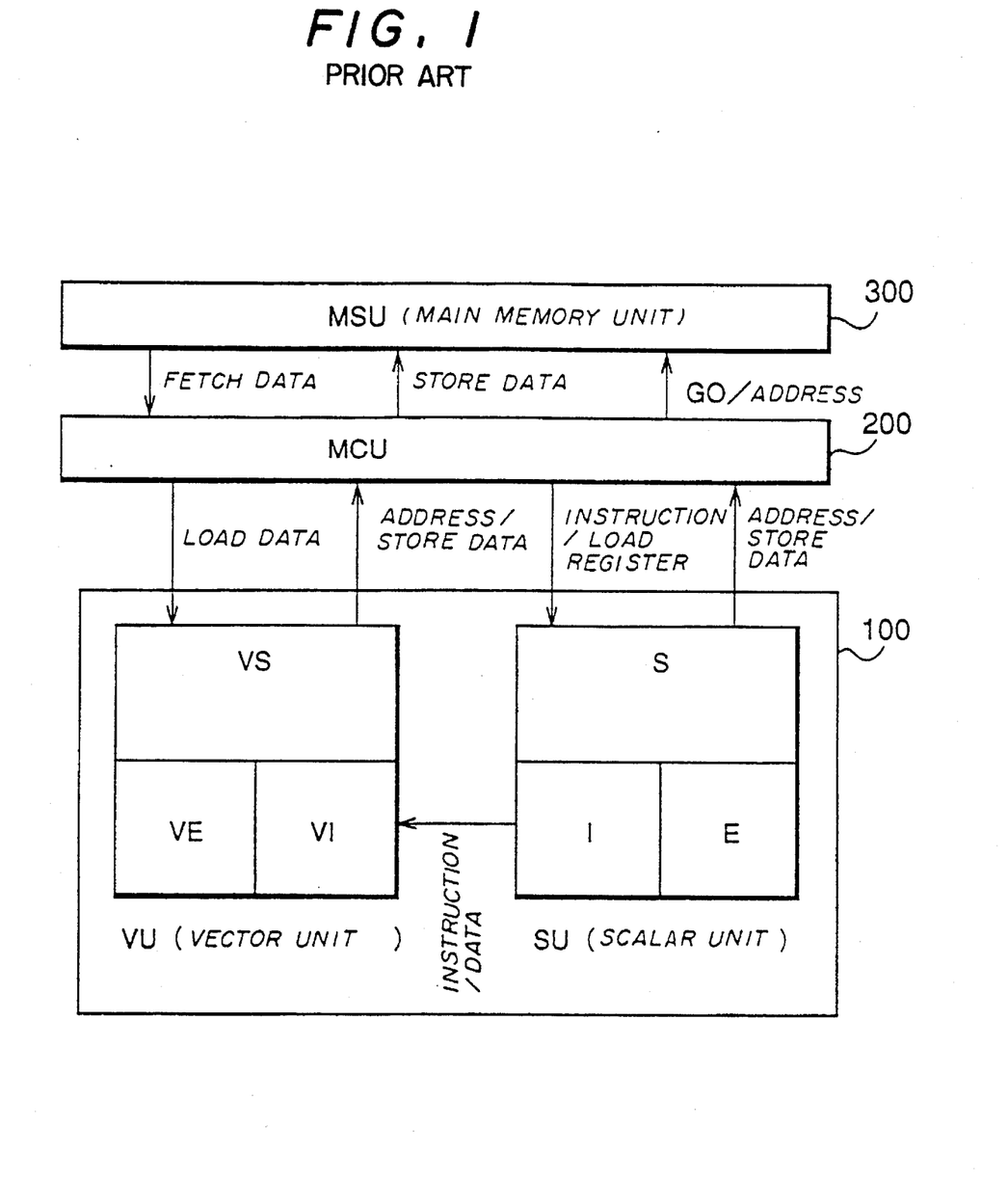
FIG. 1 (Prior Art) is a block diagram of an outline of a vector processing unit.

FIG. 1 is a block diagram of a conventional vector processing device. The vector processing device shown in FIG. 1 is made up of an instruction executing unit 100, a memory control unit (MCU) 200 and a main memory unit (MSU) 300. The instruction executing unit 100 includes a vector unit VU and a scalar unit SU. The vector unit VU performs a plurality of elements by one instruction, and the scalar unit SU performs one element by one instruction. The vector unit VU includes a vector instruction execution control unit VI, an operation pipeline unit VE and a vector memory control unit VS. Similarly, the scalar unit SU includes a scalar instruction execution control unit I, a scalar operation unit E and an access unit S.

An address and store data from the scalar unit SU are sent to the main memory unit 300 via the memory control unit 200. An instruction and load data are sent to the scalar unit SU via the memory control unit 200. Similarly, an address and store data from the vector unit VU are sent to the main memory unit 300 via the memory control unit 200, and load data from the main memory unit 300 is sent to the vector unit VU via the memory control unit 200.

Figure 2:
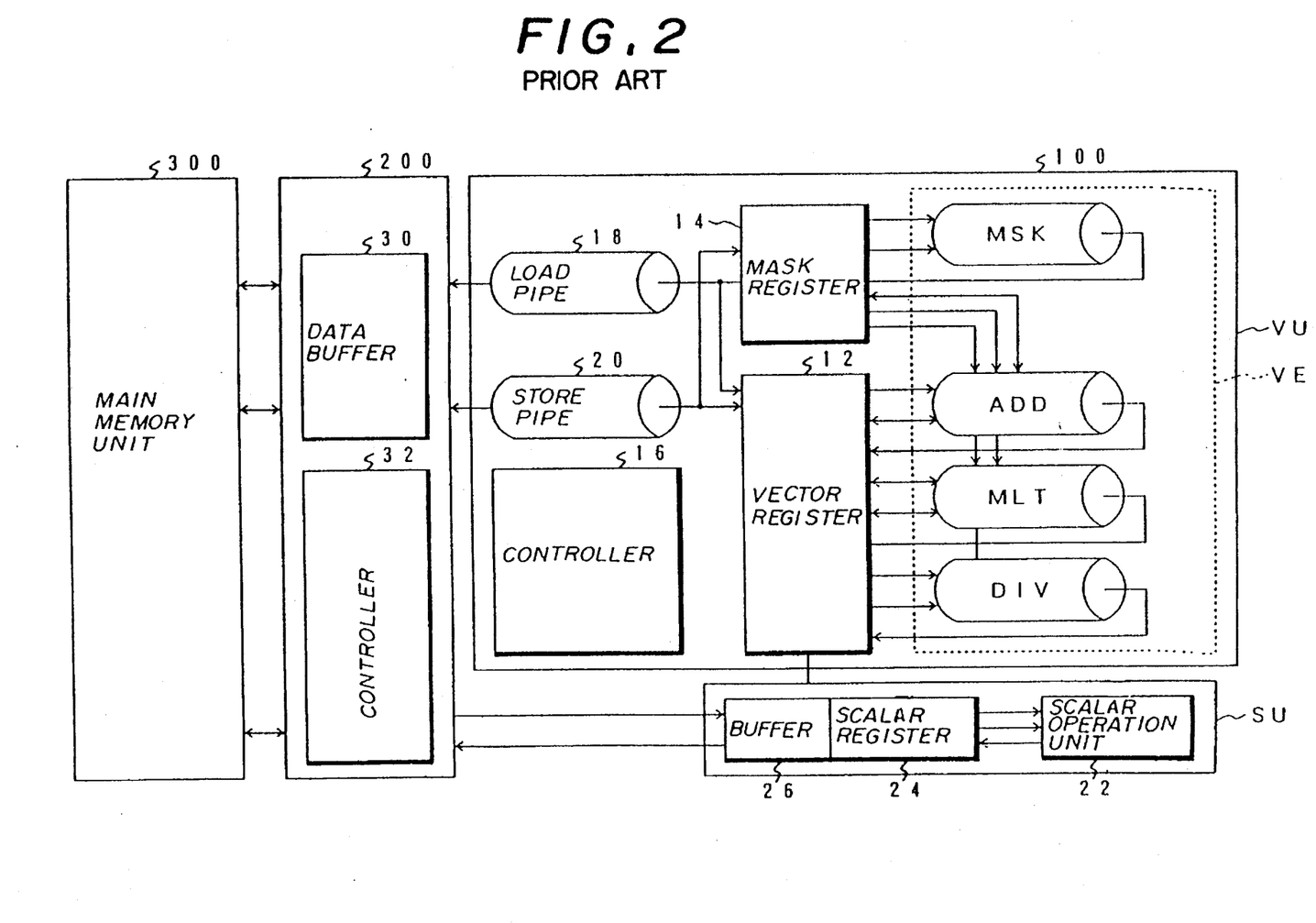
FIG. 2 (Prior Art) is a block diagram of a concrete structure of the vector processing unit shown in FIG. 1.

FIG. 2 is a block diagram of the details of the vector processing device shown in FIG. 1. The access pipeline part VS of the vector unit VU includes a vector register 12, a mask register 14, a controller 16 and data transfer pipelines 18 and 20. The operation pipeline part VE includes add/logic operation pipeline ADD, a multiplication pipeline MLT, a division pipeline DIV, and a mask pipeline MSK. The vector instruction execution control part VI shown in FIG. 1 is not shown in FIG. 2 for the sake of simplicity. The scalar operation unit E of the scalar unit SU includes a scalar operation unit 22, and the access part S includes a scalar register 24 and a buffer 26. The scalar instruction execution control part I shown in FIG. 1 is omitted for the sake of simplicity. The memory control unit 200 includes a data buffer 30 and a controller 32.

The vector processing device shown in FIG. 2 operates as follows. By way of example, execution of a vector addition instruction will now be described. The vector addition instruction VADD is executed as follows:

VLOAD VR1

VLOAD VR2

VADD VR1, VR2, VR3

VSTORE VR3.

At the commencement of execution of the vector addition instruction, the first vector load instruction VLOAD is executed, and hence data is loaded from the main memory unit 300 into a register VR1 formed in the vector register 12 via the data buffer 30 of the memory control unit 200 and the load pipeline 18 of the vector unit VU. Next, the second vector load instruction VLOAD is executed, and hence data is loaded from the main memory unit 300 to a register VR2 in the vector register 12 via the same route. Then, using the addition/logic pipeline ADD, the vector addition instruction VADD is executed, and hence the data stored in the register VR1 and the data stored in the register VR2 are added. The result of the addition operation is stored in a register VR3 formed in the vector register 12. Finally, the vector store instruction VSTORE is executed, and hence the operation result stored in the register VR3 is stored in the main memory unit 300 via the store pipeline 20 and the data buffer 30. An access from the scalar unit SU to the main memory unit 300 is carried out via the memory control unit 200.

It is desirable to operate the scalar unit SU and the vector unit VU in parallel in terms of improvements in the system processing performance. However, in a case where a vector instruction or a scalar instruction in a program uses, as an operand, data which is the result of execution of a vector instruction or a scalar instruction to be executed, it is necessary to ensure the order of execution of these instructions. The order is ensured by the serializing control.

In the conventional systems, the serializing control in the vector operation is carried out by means of a post instruction and a wait instruction. This control is carried out so that the reference of the main memory operand of an instruction to be executed prior to the post instruction is carried out in advance of reference of the main memory operand of an instruction to be executed after the wait instruction. Hence, a main memory operand sandwiched between the post instruction and the wait instruction is excluded from the serializing control of the vector operation.

Conventionally, the serializing in combinations of vector and scalar instructions is ensured as follows.

(1) Serializing between vector instructions
  (a) Ensure a vector load instruction proceeding to a post instruction
    until the priority order is assigned.
  (b) Ensure a vector store instruction proceeding to a post instruction
    until the priority order is assigned.
(2) Serializing between a scalar instruction and a vector instruction
  (a) Ensure a scalar load instruction proceeding to a post instruction
    originally ensured.
  (b) Ensure a scalar store instruction proceeding to a post instruction
    until the priority order is assigned.
(3) Serializing between a vector instruction and a scalar instruction
  (a) Ensure a vector load instruction proceeding to a post instruction
    until the priority order is assigned.
  (b) Ensure a vector store instruction proceeding to a post instruction
    until buffer invalidation to the scalar unit SU is completely reflected to the scalar unit.

The above item (3)-(b) means that, in a case where data is written into the main memory device 300 by a vector store instruction proceeding to a post instruction, if old data is stored in the buffer 26 in the scalar unit SU, an invalidating process for invalidating all data in the buffer 26 is carried out, and a scalar instruction needing to refer to the main memory after the wait instruction is not prevented to be executed.

However, the above buffer invalidating process is not capable of separating only a vector store instruction proceeding to the post instruction and processing the separated vector store instruction in view of the mechanism of the buffer invalidating process. Hence, the end of the buffer invalidating process is detected after execution of a vector store instruction between the post instruction and the wait instruction is completed. Hence, a scalar instruction that is subsequent to the wait instruction and needs to refer to the main memory is not executed until the buffer invalidating process resulting from all vector store instruction proceeding to the wait instruction is completed.

Figure 3:
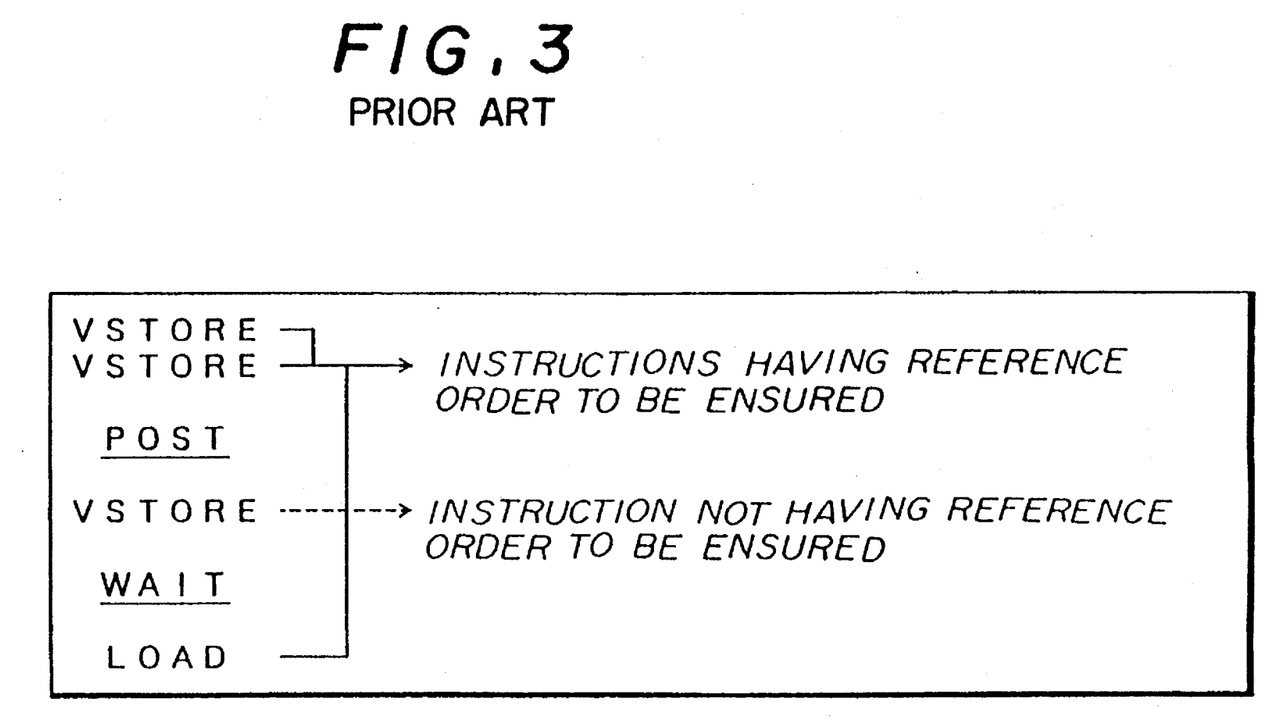
FIG. 3 (Prior Art) is a diagram of a sequence of instructions using a post instruction and a wait instruction.

FIG. 3 shows an instruction sequence for carrying out the serializing control using the post instruction and the wait instruction. In FIG. 3, VSTORE denotes a vector store instruction, POST a post instruction, WAIT a wait instruction and LOAD a scalar load instruction. The scalar load instruction LOAD is not performed until execution of the vector instruction VSTORE before the post instruction POST is completed, and the order of referring to the main memory between the vector store instruction VSTORE and the scalar load instruction LOAD is ensured. However, the serializing control is not carried out for the vector store instruction between the post instruction POST and the wait instruction WAIT, and the order of reference of the main memory is not ensured.

In the conventional structure, it is not possible to discriminate the end timing of the buffer invalidating process for the vector store instruction VSTORE before the post instruction POST from the buffer invalidating process for the vector store instruction VSTORE after the post instruction POST. Hence, the wait instruction WAIT cannot be carried out until the buffer invalidating process for all the vector store instructions VSTORE proceeding to the wait instruction WAIT. Hence, execution of an instruction that follows the wait instruction and refers to the main memory is influenced by the scalar store instruction STORE which is sandwiched between the post instruction POST and the wait instruction WAIT and is not needed to ensure the referring order, and is waited until the execution of the above instruction is completed. Hence, the processing efficiency is degraded.

SUMMARY OF THE INVENTION

It is a general object of the present invention to provide a vector processing unit in which the above disadvantages are eliminated.

A more specific object of the present invention is to provide a vector processing unit in which completion of execution of vector store instruction proceeding to the post instruction can be recognized to reduce the overhead of vector store instructions and to improve the processing speed of the serializing control.

The above objects of the present invention are achieved by a vector processing unit comprising: a vector unit (100A) having a plurality of operation pipelines and a vector register (12) connected to the plurality of operation pipelines; a scalar unit (400) having a buffer (M3); a memory unit (300); memory unit controller (300A) connected between the memory unit and the vector unit and between the memory unit and the scalar unit, said memory unit controller performing an information transfer in accordance with a serializing process among access requests by using a post instruction and a wait instruction, the access requests sandwiched between the post instruction and the wait instruction being serially carried out whereby the memory unit is serially accessed; first means (M1) for assigning a post mark to each of access requests of vector store instructions that are issued during a time when the post instruction is being executed and for stopping instruction execution of the scalar unit when there is a vector store instruction proceeding to the post instruction; and second means (M1, M2) for detecting completion of execution of an access request which proceeds to the post instruction and which does not have the post mark and for causing the scalar unit to start to operate when the above completion is detected.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENT

Figure 4:
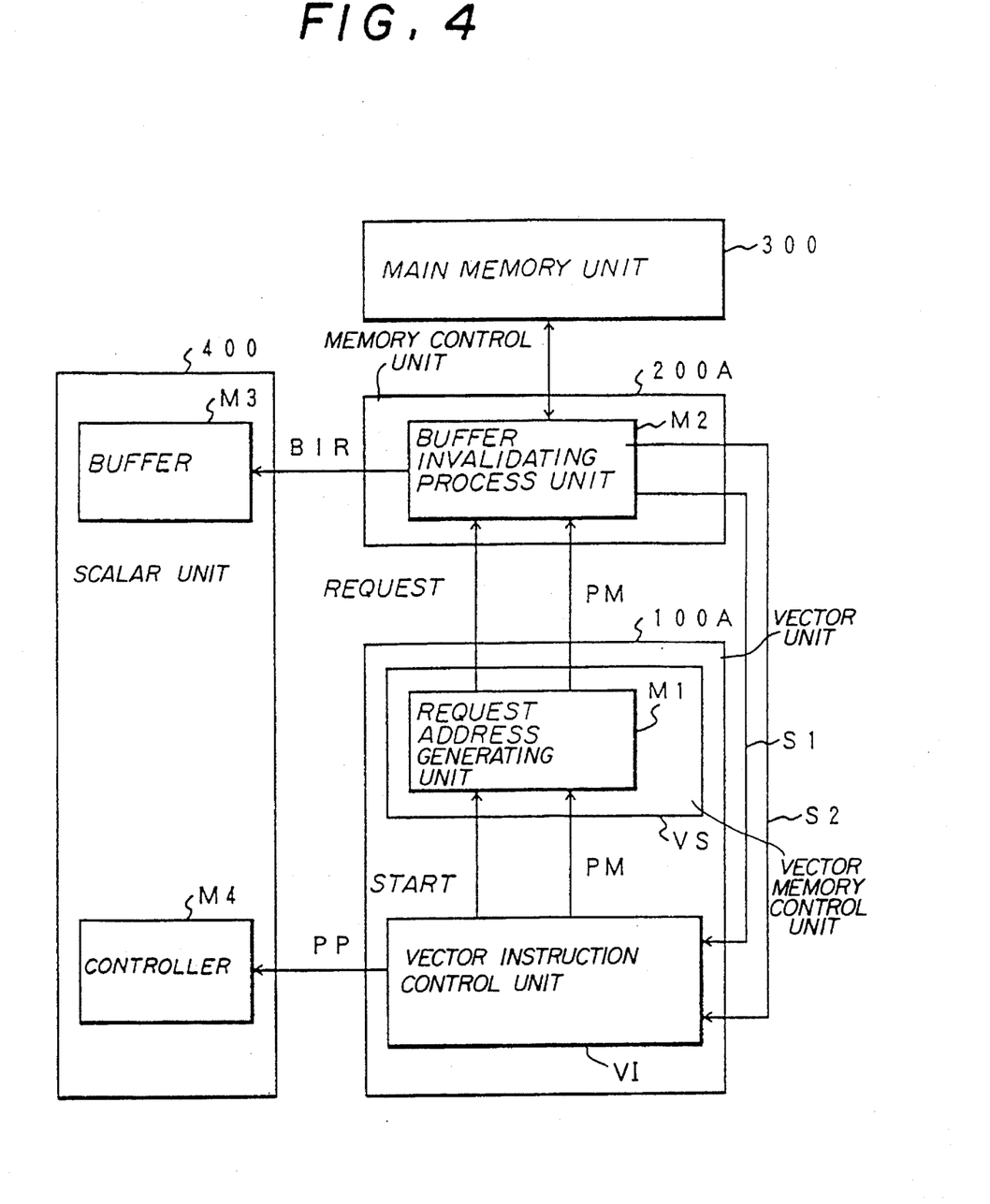
FIG. 4 is a block diagram of the principle of the present invention.

FIG. 4 is a block diagram of the principle of the present invention. A vector processing unit shown in FIG. 4 includes a vector unit 100A, a memory control unit 200A, a main memory unit 300 and a scalar unit 400. The vector unit 100A includes a vector instruction control execution unit VI and a vector memory control unit VS. An operation pipeline unit VE of the vector unit 100A is not shown for the sake of simplicity. The vector memory control unit VS includes a request address generating unit M1. The memory control unit 200A includes a buffer invalidating process unit M2. The scalar unit 400 includes a buffer M3 and a controller M4.

The vector instruction control execution unit VI outputs a start signal START and a post mark PM to the vector memory control unit VS. The post mark PM indicates a vector store instruction after the post instruction in order to discriminate such a vector store instruction after the post instruction from a vector store instruction before the post instruction. These vector store instructions being issued to the vector unit 100A by the scalar unit 400. The vector instruction control execution unit VI receives the post instruction from the scalar unit 400, and turns ON a post pending signal PP when the preceding access instruction is being executed. Thereby, the control unit M4 of the scalar unit 400 is informed that the access instruction is being executed.

The request address generating unit M1 of the vector memory control unit VS is receives the start signal and the post mark PM, and generates a request address (an address relating to an access request) from these signals. Further the request address generating unit M1 outputs the post mark PM to the buffer invalidating process unit M2 for each request address. The buffer invalidating process unit M2 outputs status signals S1 and S2 relating to an access request which has not been processed to the vector instruction execution control unit VI. For example, while the status signal S1 is being output (ON), the status signal S1 indicates that a vector store instruction with the post mark PM added thereto after the post instruction has not been executed and still remains. While the status signal is being output (ON), the status signal S2 indicates a vector store instruction without the post mark PM prior to the post instruction has not been executed and still remains.

The vector instruction control unit VI receives the status signals S1 and S2 from the vector invalidating process unit M2. When the unit vector instruction control VI determines, from the received signals, that the access without the post mark PM is completed, the vector instruction control unit VI informs the controller M4 of the scalar unit 400 of end of execution of the instruction having the reference order to be ensured. Hence, the scalar unit 400 is allowed to start execution of the access instruction which is inhibited from being executed by means of the wait instruction. Hence, it becomes possible to eliminate the overhead of the wait instruction by a vector store instruction subsequent to the post instruction and hence improve the processing efficiency of the scalar unit 400 and the parallel process performance of the vector unit.

The buffer invaliding process unit M2 outputs a buffer invalidation request signal to the buffer M3 of the scalar unit 400 irrespective of whether the post mark PM is ON or OFF.

Figure 5:
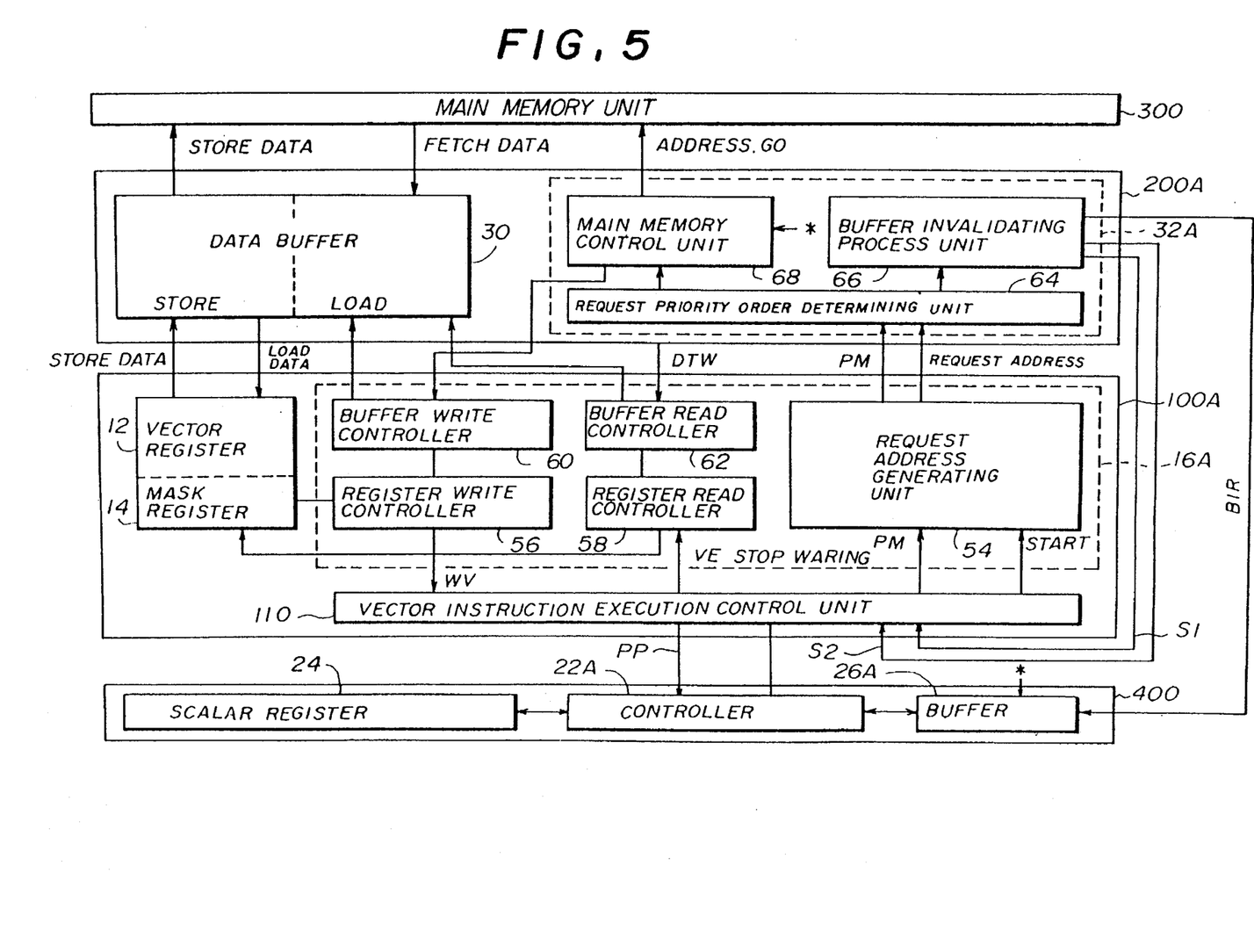
FIG. 5 is block diagram of a vector present invention processing unit according to an embodiment of the present invention.

FIG. 5 is a block diagram of an essential part of a vector processing unit according to an embodiment of the present invention. In FIG. 5, parts that are the same as those shown in FIG. 4 are given the same reference numbers as previously. The vector processing unit shown in FIG. 5 includes the vector unit 100A, the memory control unit 200A, the main memory unit 300, and the scalar unit 400.

The vector unit 100A includes a vector instruction execution control unit 110, a controller 16A, the vector register 12, the mask register 14 and the operation pipelines. For the sake of simplicity, the operation pipelines are not shown in FIG. 5, but are connected to the vector register 12 and the mask register 14, as shown in FIG. 2. The vector instruction execution control unit 110, which is connected to the scalar unit that is not shown in FIG. 5, outputs the start signal START to the controller 16A and receives a write valid signal WV from the controller 16A. The vector instruction execution control unit 100 outputs the post pending signal PP to the scalar unit 400, and receives instructions and data from the scalar unit 400. Further, the vector instruction execution unit 110 receives the aforementioned status signals S1 and S2 from a controller 32A of the memory control unit 200A.

The controller 16A includes a request address generator 54, a register write controller 56, a register read controller 58, a buffer write controller 60 and a buffer read controller 62. These controllers are configured by, for example, a single microcomputer or a plurality of microcomputers, and executes programs which will be described later.

The controller 32A of the memory control unit 200A includes a request priority order determining unit 64, a buffer invalidating process unit 66, and a main memory control unit 68. The request priority order determining unit 64 receives the start signal START from the vector instruction execution control unit 110, and outputs an access request (address generation) to the controller 32A. At this time, the buffer invalidating process unit 66 assigns the aforementioned post mark PM to a vector store instruction after the 10 post instruction for each access request. Further, the buffer invalidating process unit 66 outputs the buffer invalidating request signal BIR to the scalar unit 400.

The main memory controller 68 receives the access request from the request priority order determining unit 64, and outputs necessary signals including a real address. The data buffer 30 is segmented into parts respectively used for the store and load operations.

The scalar unit 400 includes a controller 22A, the scalar register 24 and the buffer 26. The controller 22A includes the aforementioned scalar operation unit 22. The scalar register 24 is used for the scalar operation. The buffer 26 is used to improve efficiency of transfer of data and instructions between the main memory unit 300 and the scalar unit 400.

A description will now be given of the operation of the embodiment shown in FIGS. 4 and 5.

First, an outline of the operation in which a load instruction and a store instruction are executed. The scalar unit 400 receives a vector instruction read from the main memory unit 300 via the data buffer 30, and sends the received vector instruction to the vector instruction execution control unit 110.

When the received vector instruction is a load instruction, the request address generator 54 generates an access request (generation of a real address) in response to the start signal of the received vector instruction. On the basis of the priority order assigned to the vector load instruction, the priority order determining unit 64 outputs the address signal and an activating signal (GO) to the main memory unit 300. At the same time, the main memory control unit 68 sends a data output signal to the buffer write controller 60 in synchronism with a timing at which data fetched from the main memory unit 300 is output. The buffer write controller 60 receives the data output signal and writes the fetched data from the main memory unit 300 into the data buffer 30. The register write controller 56 writes the data written into the data buffer 30 into the vector register 12.

When the vector instruction received from the scalar unit 400 is a store instruction, the register read controller 58 reads data from the vector register 12 at the same time as the start signal START of the received vector instruction, and writes the read data into the data buffer 30. The request priority order determining unit 64 assigns the priority order to the access request, and thereafter sends the data transfer request to the buffer read controller 62 and the buffer invalidating process unit 66. When the access request is a fetch request from the scalar unit 400, the buffer invalidating process unit 66 registers the address in an built-in tag register (TAG). When the access request requests a vector store, the buffer invalidating process unit 66 refers to the tag register. When an address corresponding to the access request has been registered in the tag register, the buffer invalidating process unit 66 carries out the invalidating process for the buffer 26 of the scalar unit 400. When the buffer read controller 62 receives the data transfer request, the controller 62 reads the stored data from the data buffer 30 and outputs the data to the main memory unit 300. At the same time as the above, the main memory controller 68 of the memory control unit 200A outputs the address and the activating signal (GO) to the main memory unit 300.

A detailed description will now be given of the operation of the structural parts of the embodiment of the present invention.

Figure 6:
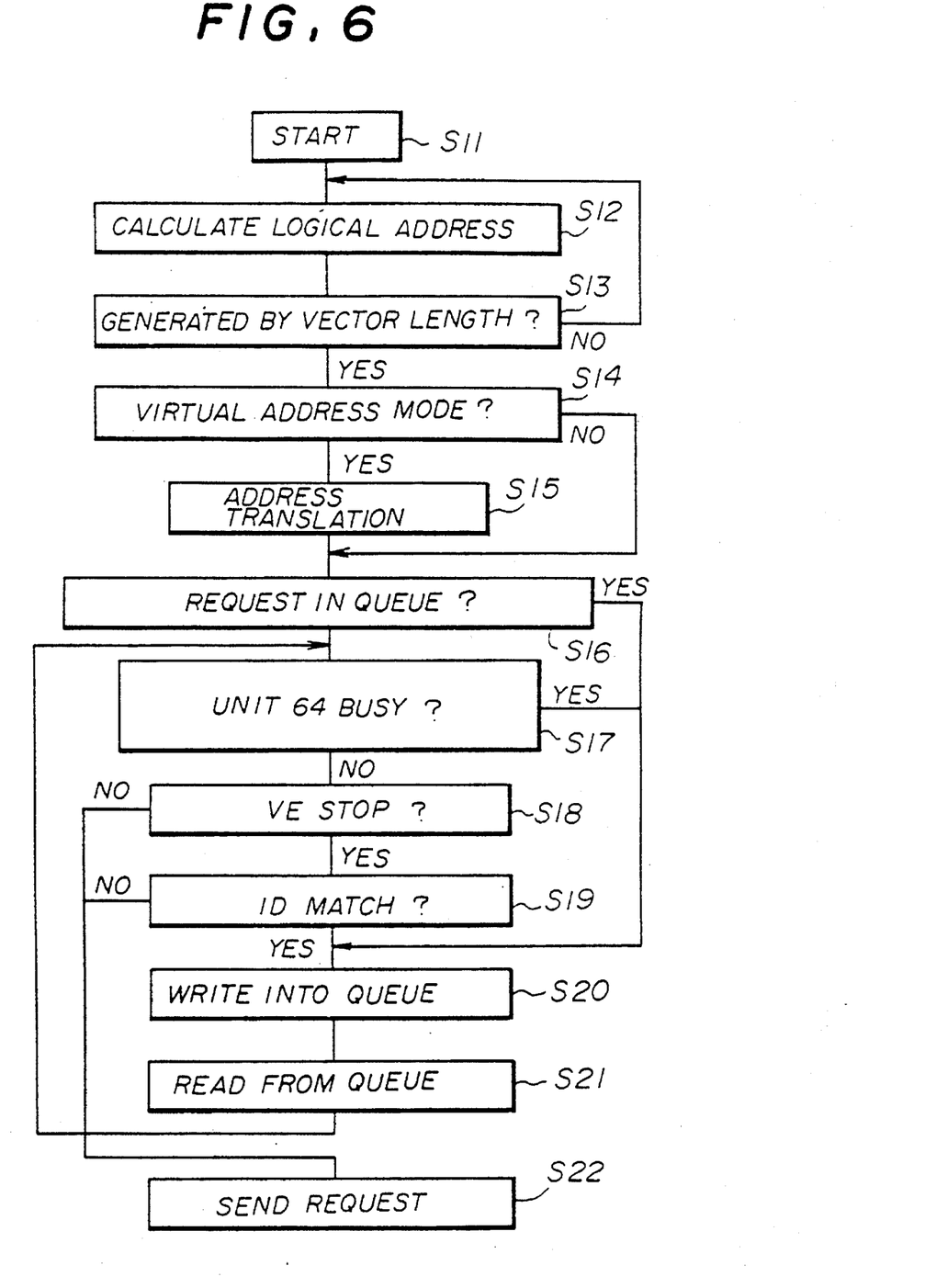
FIG. 6 a flowchart of the operation of a request address generator shown in FIG. 5.

FIG. 6 is a flowchart of the operations of the request address generator 54 and the request priority order determining unit 64. When the activating unit from the vector instruction execution control unit 110 is received, the process shown in FIG. 6 is started (step S11). A beginning address of the access request and a distance value are received from the vector instruction execution control unit 110, and a logical address is derived therefrom (step S12). When it is confirmed that the logical address equal to the vector length has been generated (step S13), the request address generator 54 determines whether or not a virtual address mode has been selected (step S14). In the case the virtual address mode has been selected, the logical address is translated into the real address (step S15). The request address generator 54 determines whether or not a read address is held in an address queue buffer 50 (step S16). When the virtual address mode has not been selected, step S16 is carried out without step S15.

If it is determined, in step S16, that there is a real address (access request) stored in the address queue register 50, step S20 is executed. If not, the request address generator 54 determines whether or not the request priority order determining unit 64 is busy (step S17). This determination is carried out by referring to a busy signal line extending from the priority order determining unit 64. When it is determined that the unit 64 is busy, step S20 is carried out. When it is determined, in step S17, that the unit 64 is not busy, a read controller 52 of the request priority order determining unit 64 determines whether or not an access request stop signal VE-STOP is being supplied. When the result of step S18 is NO, the access request (real address) is immediately sent to the main memory unit 300 via the request priority order determining unit 64 without writing the real address into the address queue register 50 (step S22).

When it is determined, in step S18, that the access request stop signal VE-STOP is being supplied, it is determined that identification information ID assigned to the real address from the request address generator 54 matches identification information ID from the register read controller 58. When the identification information ID from the generator 54 does not match that from the controller 58, the address and the start signal are immediately output to the main memory unit 300 (step S22). When it is determined, in step S19, that the identification information ID from the generator 54 matches that from the controller 58, the read address is written into the address queue buffer 50, and is held until the access request stop signal VE-STOP is turned OFF. That is, step S22 is carried out when the address queue register 50 is accessed in step S21 and the results of determination steps S16 and S17 are NO and when the result of step S18 is YES.

Figure 7:
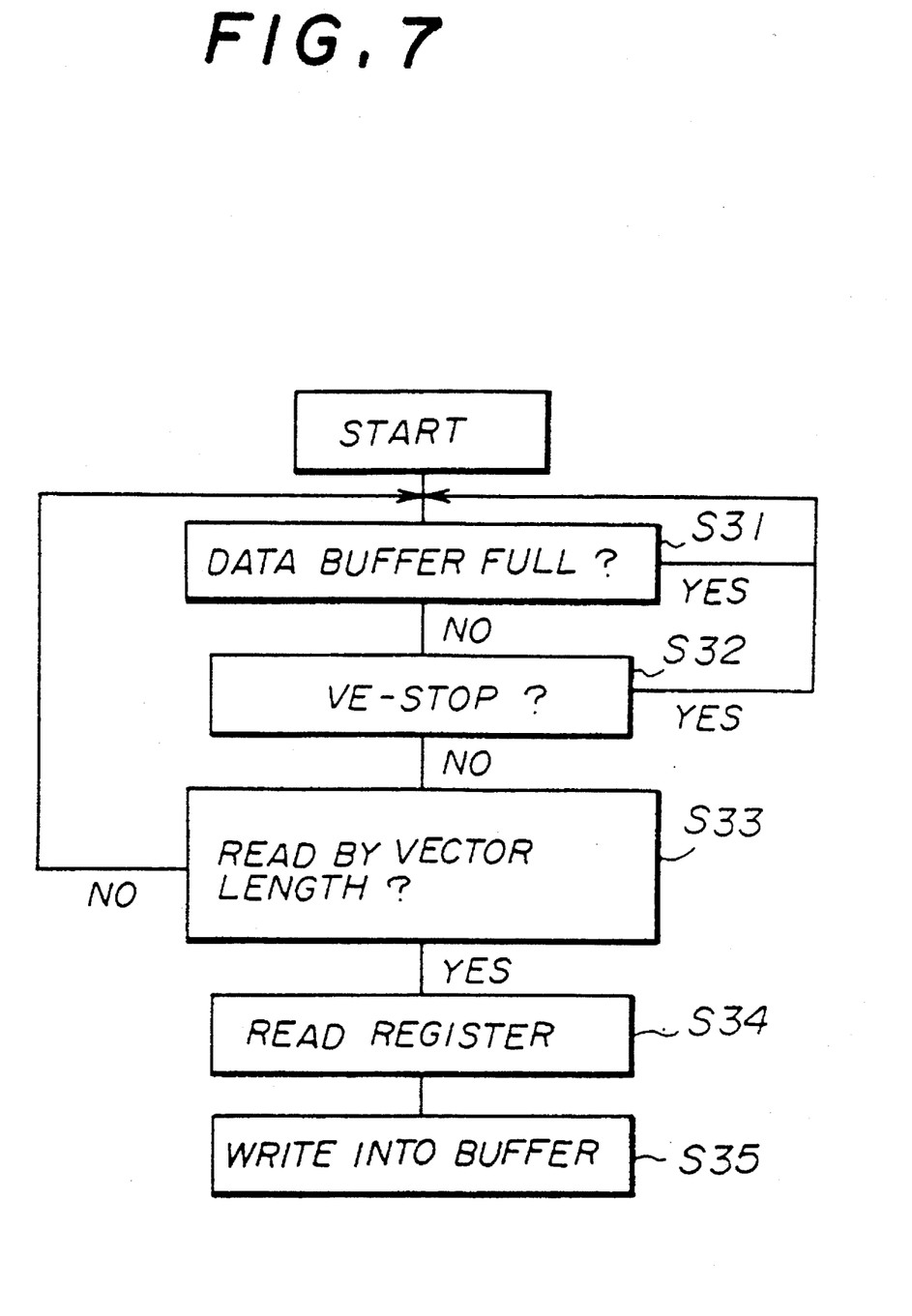
FIG. 7 is a flowchart of the operation of a register read controller shown in FIG. 5.

FIG. 7 is a flowchart of the operation of the register read controller 58. First, the register read controller 58 determines whether or not the data buffer is full (step S31). When it is determined that the data buffer 30 is full, the register read controller 58 repeatedly performs step S32 until the determination result of step S32 becomes NO. When the determination result of step S32 is NO, the register read controller 58 determines whether or not the access request stop signal VE-STOP has been generated (step S32). When the result of this determination is YES, the process returns to step S31. When the determination result of step S32 is NO, the register read controller 58 determines whether or not a quantity of data equal to the vector length has been read from the vector register (step S33). When the result of this determination is NO, the process returns to step S31. When the determination result of step S33 is YES, the register read controller 58 reads data from the vector register 12 (step S34), and writes the read data into the data buffer (step S35).

Figure 8:
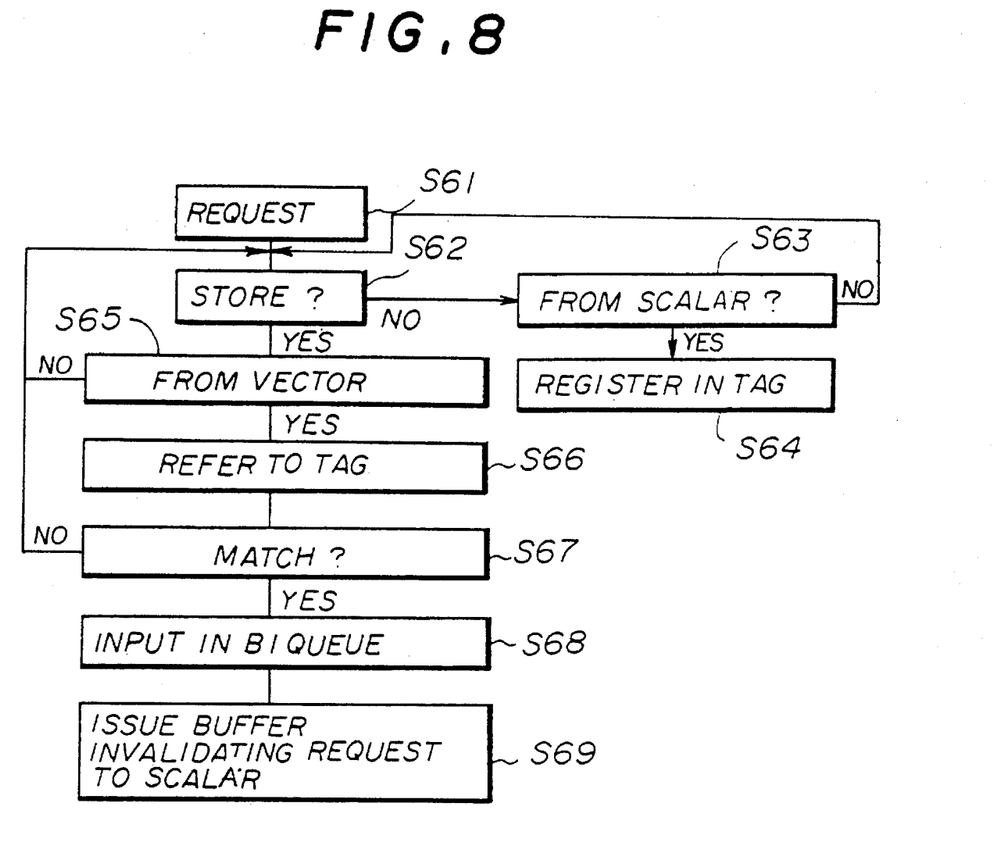
FIG. 8 is a flowchart of the operation of a buffer invalidating process unit shown in FIG. 5.

FIG. 8 is a flowchart of the buffer invalidating process unit 66 shown in FIG. 4. The buffer invalidating process unit 66 receives the data transfer signal from the request priority order determining unit 64 (step S61), and determines whether or not the data transfer request corresponds to a store instruction (step S62). When the requests does not correspond to the store instruction, the unit 66 determines whether or not the access request corresponds to a fetch process from the scalar unit 400 (step S63). When it is determined that the access request corresponds to the fetch process from the scalar unit 400, the buffer invalidating process unit 66 registers the address of the access request into the built-in tag register (TAG) (step S64). Further, the buffer invalidating process unit 66 determines whether or not the access request corresponds to a store instruction from the vector unit 100A (step S65). When the determination result of step S65 is YES, the buffer invalidating process unit 66 refers to the tag register (step S67). When the access request has been registered in the tag register (step S67), the unit 66 stores data indicating that the access invalidating process relating to the access request can be performed is stored in the queue register (BI) (step S68), and thereafter performs the invalidating process for the buffer 26 (FIG. 5) of the scalar unit SU (step S69). The queue register is inside or outside the buffer 26.

Figure 9:
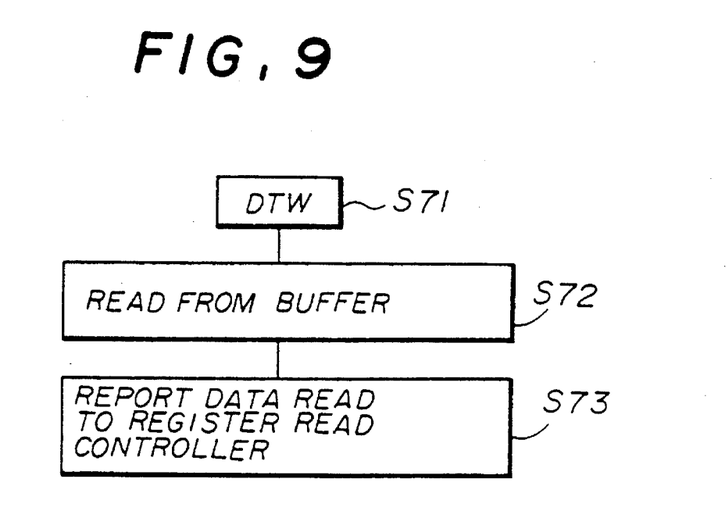
FIG. 9 is a flowchart of the operation of a buffer write controller shown in FIG. 5.

FIG. 9 is a flowchart of the operation of the buffer write controller 58. The buffer write controller 58 receives a warning signal DTW (Data Transfer Warning) from the request priority order determining unit 64 (step S71), the warning signal DTW indicating a drain of data. Then data is read from the data buffer 30 (step S72), and the reading of data is reported to the register read controller 58 (step S73).

Figure 10:
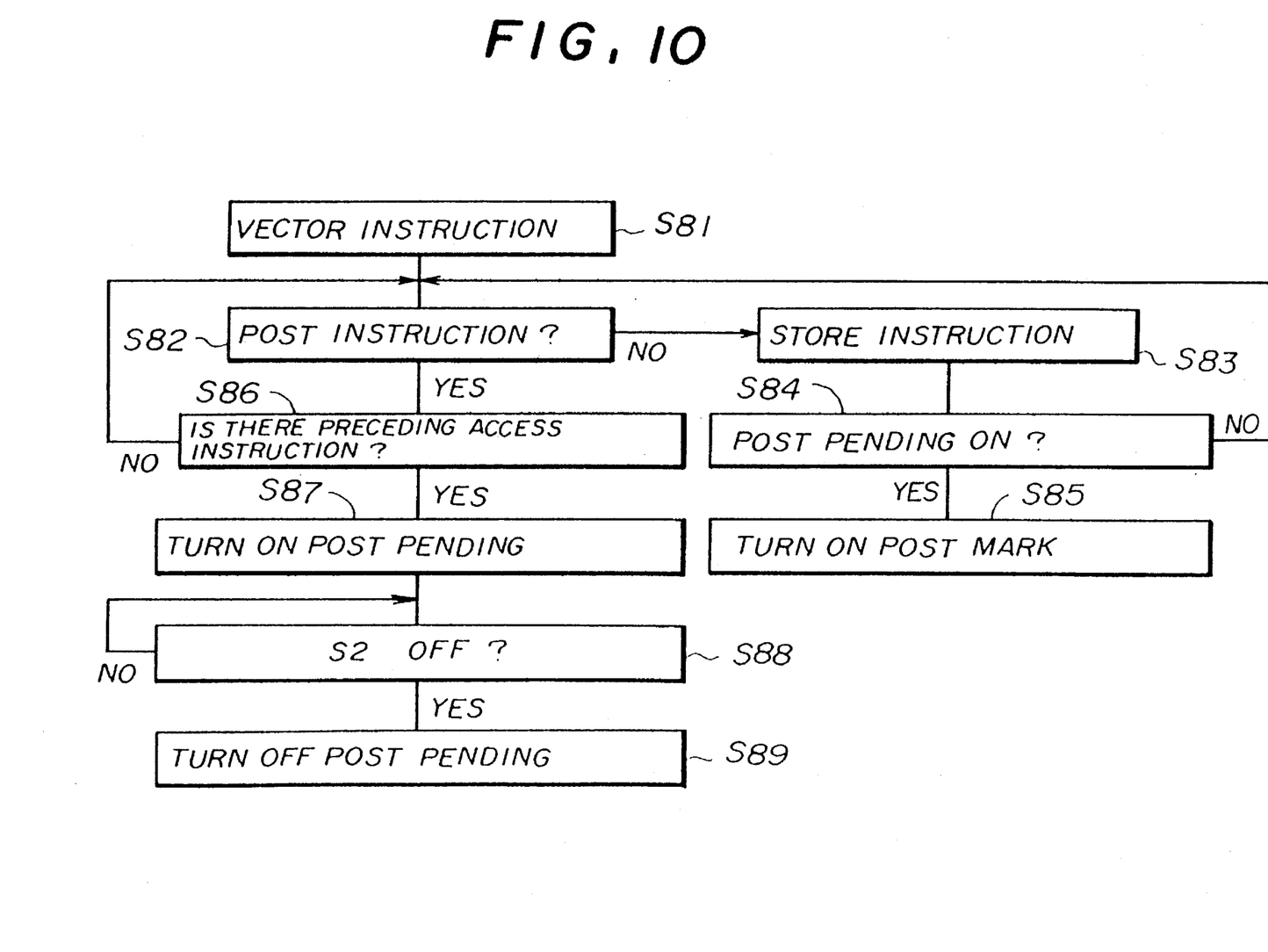
FIG. 10 is a flowchart of the operation of a post instruction control by means of a vector instruction execution control unit shown in FIG. 5.

FIG. 10 is a flowchart of an operation relating to control of the post instruction by the vector instruction execution control unit 110. The vector instruction execution control unit 110 receives a vector instruction from the controller 22A of the scalar unit 400 (step S81). The vector instruction control unit 100 determines whether or not the received vector instruction is the post instruction (step S82). When it is determined that the received vector instruction is the post instruction, the vector instruction execution control unit 110 determines whether or not there is any access instruction proceeding to the post instruction (step S86). When it is determined that there is a preceding access instruction, the vector instruction execution control unit 110 turns ON the post pending signal PP (step S87), and informs the scalar unit 400 that the preceding access instruction is being executed.

When it is confirmed that a vector store instruction is issued during the post pending process (steps S82 and S83), the vector instruction execution control unit 110 turns ON the post mark PM (assignment of the post mark) (step S85) if it is determined that the post pending signal PP is ON (steps S84). The post mark PM is output to the request address generator 54 together with the start signal START.

On receipt of the post mark PM, the request access generator 54 assigns the post mark PM for each access request in step S22, and outputs it to the request address priority order determining unit 64. The buffer invalidating process unit 66 holds the status signal S2 in the ON state if there is an access request which is valid and has not been processed and which is not assigned the post mark PM (post mark PM is OFF). At the time when the access process in which the post mark PM is OFF is completed, the buffer invalidating process unit 66 turns the status signal OFF. Further, if there is an access request which is valid and has not been processed and which is assigned the post mark PM (post mark PM is ON), the buffer invalidating process 66 holds the status signal S1 in the OFF state. The above processes are carried out, for example, in step S67 shown in FIG. 8.

The vector instruction execution control unit 110 determines whether or not the status signal S2 is OFF (step S88). When it is confirmed that the status signal S2 is switched to OFF, the vector instruction execution control unit 110 determines that all vector store instructions prior to the post instruction have been completed, and turns OFF the post pending signal PP (step S89).

The controller 22A of the scalar unit 400 which inhibits execution of an access instruction subsequent to the post instruction by means of the wait instruction, ends execution of the wait instruction when the post pending signal PP is turned OFF, and starts execution of the subsequent access instruction.

As described above, only a vector store instruction subsequent to the post instruction is discriminated from other instructions. Hence, it becomes possible to eliminate the overhead of the wait instruction by a vector store instruction subsequent to the post instruction and to improve the processing efficiency of the scalar unit and the parallel process performance of the vector unit.

Figure 11A:
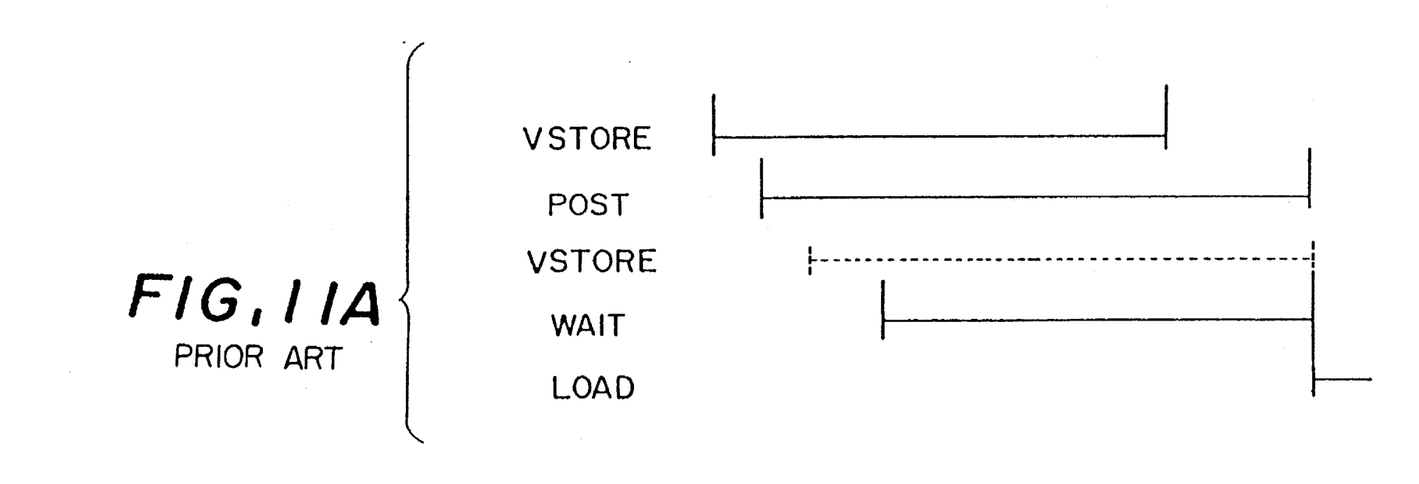
FIG. 11A (Prior Art) is a timing chart of the conventional operation.
Figure 11B:
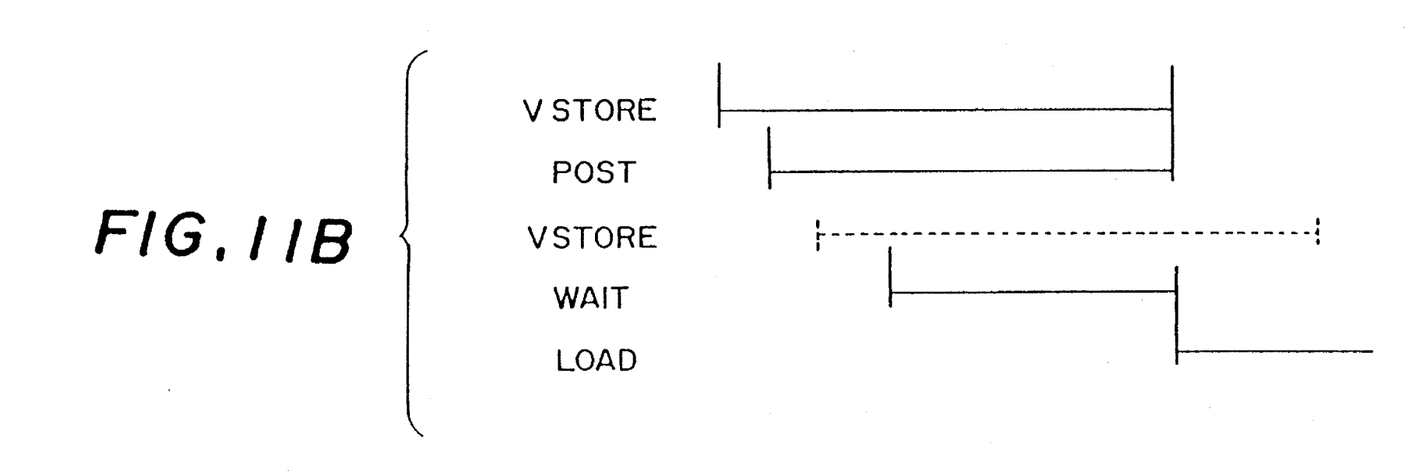
FIG. 11B is a timing chart of the operation of the embodiment of the present invention.

FIG. 11A is an operation timing chart of the conventional control, and FIG. 11B is an operation timing chart of the embodiment of the present invention. According to the conventional control, a scalar load instruction from the scalar unit subsequent to the wait instruction is started after execution of a vector store instruction sandwiched between the post instruction and the wait instruction is completed. On the other hand, according to the embodiment of the present invention, execution of the scalar load instruction LOAD is started when the vector store instruction VSTORE proceeding to the post instruction is completed.

Figure 12:
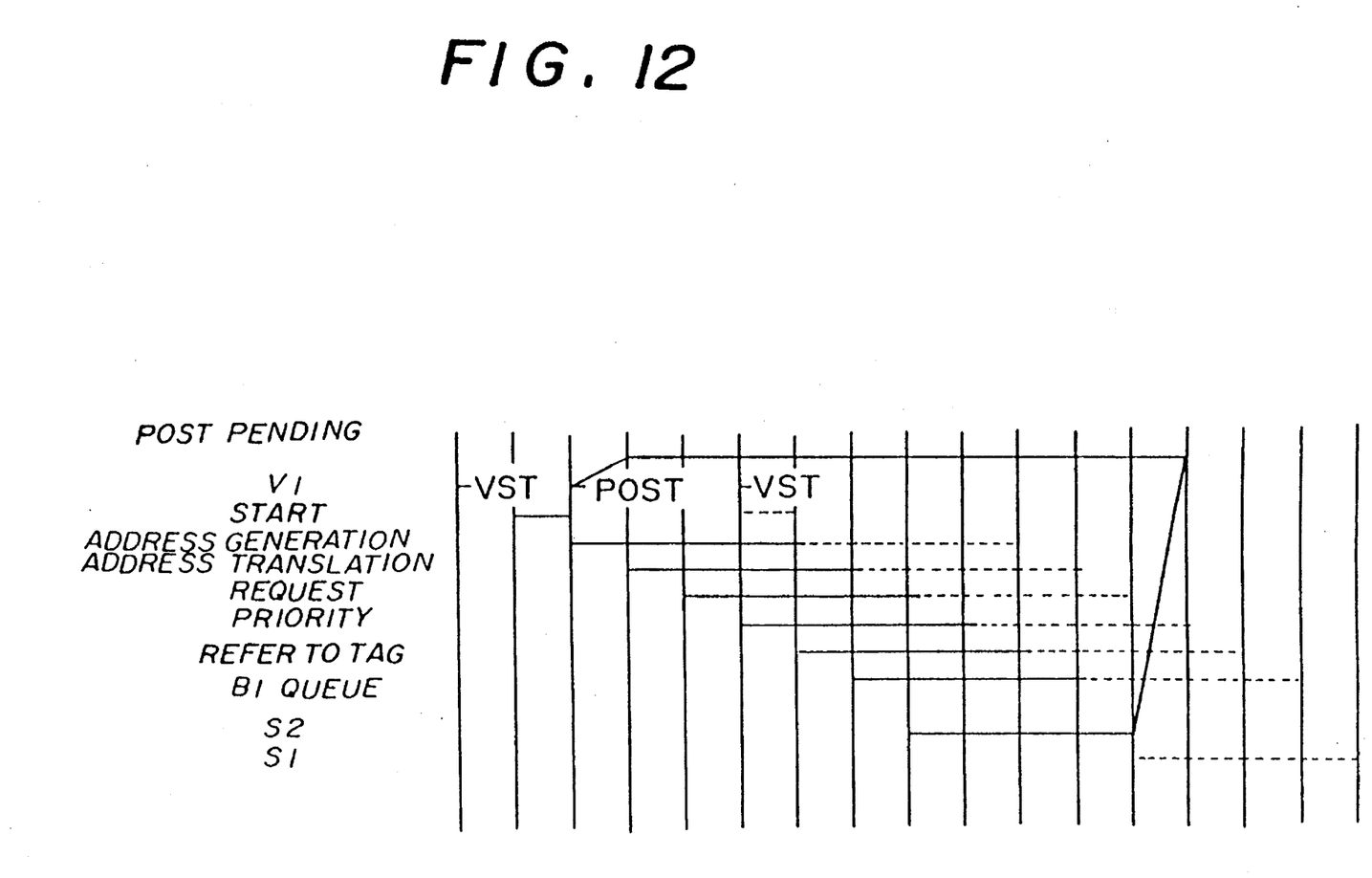
FIG. 12 is a timing chart of the operation of the embodiment of the present invention.

FIG. 12 is a sequence diagram of the post instruction control according to the aforementioned embodiment of the present invention. In FIG. 12, VST denotes a vector instruction from the controller 22A of the scalar unit 400. On receipt of the post instruction, the post pending signal PP is turned ON, and maintained until the status signal S2 is received.

According to the present invention, only a vector store instruction proceeding to the post instruction is discriminated from other instructions, it becomes possible to eliminate the overhead of the wait instruction by a vector store instruction subsequent to the post instruction and to improve the processing efficiency of the scalar unit SU and the parallel process performance of the vector unit.

The present invention is not limited to the specifically disclosed embodiment, and variations and modifications may be made without departing from the scope of the present invention.

What is claimed is:

1. A vector processing unit comprising:

a vector unit having a plurality of operation pipelines and a vector register connected to the plurality of operation pipelines;

a scalar unit having a buffer;

a memory unit;

a memory unit controller connected between the memory unit and the vector unit and between the memory unit and the scalar unit, said memory unit controller performing an information transfer in accordance with a serializing process among access requests by using a post instruction and a wait instruction, access requests sandwiched between the post instruction and the wait instruction being serially carried out;

first means for assigning a post mark to each access request of a vector store instruction issued during a time when the post instruction is being executed and for stopping instruction execution of the scalar unit when there is an unexecuted vector store instruction issued prior to the post instruction; and second means for detecting completion of execution of an access request which is issued prior to the post instruction and which does not have a post mark and for causing the scalar unit to start to operate when said completion is detected.

2. The vector processing unit as claimed in claim 1, wherein the access request for which the second means detects completion of execution is a vector store instruction.

3. A vector processing unit for controlling access requests of vector store instructions to a memory unit, the vector processing unit comprising:

- a scalar unit which accesses the memory unit and executes instructions;
- a vector unit which accesses the memory unit, the vector unit issuing an access request to access the memory unit in response to a vector store instruction;
- a memory unit controller through which the scalar unit and the vector unit access the memory unit, the memory unit controller performing a transfer between the scalar unit and the memory unit and between the vector unit and the memory unit by using a post instruction and a wait instruction where access requests sandwiched between the post instruction and the wait instruction are serially executed to serially access the memory unit;
- first means for assigning a post mark to each access request of a vector store instruction issued when the post instruction is being executed and for stopping instruction execution of the scalar unit when an unexecuted access request of a vector store instruction is issued prior to the post instruction; and
- second means for detecting completion of execution of access requests issued prior to the post instruction and for causing the scalar unit to start to operate when said completion is detected.

\* \* \* \* \*

UNITED STATES PATENT AND TRADEMARK OFFICE
CERTIFICATE OF CORRECTION

PATENT NO. : 5,574,924
DATED : November 12, 1996
INVENTOR(S) : Toru YOSHINAGA et al.

It is certified that error appears in the above-indentified patent and that said Letters Patent is hereby corrected as shown below:

```
Col. 1, line 48, delete, "need", and insert --needed--.
Col. 5, line 1, after "is" insert --a--;
        line 1, delete "present invention"
        line 4, after "6" insert --is--
        line 54, delete "is".
Col. 6, line 5, delete "unit"; after "control" insert --
                unit--
        line 18, change "invaliding" to --invalidating--
        line 60, delete "10".
Col. 7, line 40, delete "an", and insert --a--.
Col. 8, line 1, after "case" insert --where--.
Col. 8, line 63, delete "requests", and insert
        --request--.
Col. 10, line 40, delete "SU".
```

Signed and Sealed this

Eighth Day of July, 1997

Attest:

BRUCE LEHMAN

Attesting Officer

Commissioner of Patents and Trademarks